United States Patent
Salahudeen et al.

(10) Patent No.: US 9,694,330 B1
(45) Date of Patent: Jul. 4, 2017

(54) INTERNAL BATCH MIXER WITH THREE-WING NON-INTERMESHING ROTORS

(71) Applicant: KING SAUD UNIVERSITY, Riyadh (SA)

(72) Inventors: Shafaat Ahmed Salahudeen, Tamilnadu (IN); Othman Y. Alothman, Riyadh (SA); Rabeh H. Elleithy, Lenox, MA (US)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/287,627

(22) Filed: Oct. 6, 2016

(51) Int. Cl.
*B01F 7/00* (2006.01)
*B01F 7/08* (2006.01)

(52) U.S. Cl.
CPC ...... *B01F 7/00975* (2013.01); *B01F 7/00425* (2013.01); *B01F 7/08* (2013.01); *B01F 2215/0049* (2013.01)

(58) Field of Classification Search
CPC ........ B01F 7/04; B01F 7/042; B01F 7/00966; B01F 7/08; B01F 2215/0049
See application file for complete search history.

(56) References Cited

U.S. PATENT DOCUMENTS

| | | | |
|---|---|---|---|
| 4,744,668 A | * | 5/1988 | Nortey .................... B29B 7/186 366/149 |
| 5,984,516 A | | 11/1999 | Inoue et al. |
| 6,494,607 B2 | | 12/2002 | Valsamis et al. |
| 7,854,542 B2 | | 12/2010 | Inoue et al. |
| 9,000,070 B2 | | 4/2015 | Hogan et al. |

FOREIGN PATENT DOCUMENTS

CN    105291291 A    2/2016

* cited by examiner

*Primary Examiner* — Tony G Soohoo
*Assistant Examiner* — Anshu Bhatia
(74) *Attorney, Agent, or Firm* — Richard C. Litman

(57) ABSTRACT

The internal batch mixer with three-wing non-intermeshing rotors includes a pair of non-intermeshing, counter-rotating, tangential rotors each having three wing portions. The internal batch mixer includes a housing defining a mixing chamber, where the mixing chamber includes first and second substantially circular chamber cavities in open communication with one another at a central region of the mixing chamber. The first and second non-intermeshing, counter-rotating winged rotors are respectively rotationally mounted within the first and second substantially circular chamber cavities, such that the central region of the mixing chamber defines an interacting mixing region between the first and second non-intermeshing, counter-rotating winged rotors. The first and second non-intermeshing, counter-rotating winged rotors are driven to counter-rotate with respect to one another. Each rotor has a substantially helical contour and a blade portion divided into three separate wings.

5 Claims, 8 Drawing Sheets

INTERNAL BATCH MIXER WITH THREE-WING NON-INTERMESHING ROTORS

BACKGROUND OF THE INVENTION

1. Field of the Invention

The present invention relates generally to mixing machines, and particularly to an internal batch mixer with three-wing, non-intermeshing, counter-rotating, tangential rotors.

2. Description of the Related Art

Internal batch mixers are relatively common mixers making use of a pair of rotors for mixing a wide range of materials. In the particular case of molten, or liquid, polymers, internal batch mixers tend to generate a great deal of shear flow. This shear flow generates viscous heating which can lead to the degradation of polymers in the mixing chamber. Further, in conventional mixers, elongation flow exists only in the middle of the batch mixer and shear flow at the remaining part.

Thus, an internal batch mixer with three-wing non-intermeshing rotors solving the aforementioned problems is desired.

SUMMARY OF THE INVENTION

The internal batch mixer with three-wing non-intermeshing rotors includes a pair of non-intermeshing, counter-rotating, tangential rotors each having three wing portions. As in a conventional internal batch mixer, a housing defining a mixing chamber is provided. The mixing chamber includes first and second substantially circular chamber cavities in open communication with one another at a central region of the mixing chamber. First and second non-intermeshing, counter-rotating winged rotors are respectively rotationally mounted within the first and second substantially circular chamber cavities, such that the central region of the mixing chamber defines an interacting mixing region between the first and second non-intermeshing, counter-rotating winged rotors. The first and second non-intermeshing, counter-rotating winged rotors are driven to counter-rotate with respect to one another.

Each of the first and second non-intermeshing, counter-rotating winged rotors includes a blade body and an axle. The blade body has first, second and third wings, each having a substantially helical contour. A radial clearance e between each of the first and second wings and an internal wall of the mixing chamber is defined by $$e = \frac{R_c}{40},$$

where $R_c$ is a radius of each of the first and second substantially circular chamber cavities. Preferably, the radial clearance of the third wing is zero (or close to zero).

Further, the blade body of each rotor has opposed first and second ends, such that a first portion of the blade body is defined between the first end thereof and an axial center thereof, and a second portion of the blade body is defined between the second end thereof and the axial center thereof. The first portion is helically twisted by 60° in a first rotational direction (e.g., counterclockwise) and the second portion is helically twisted by 60° in a second rotational direction opposite the first rotational direction (e.g. clockwise).

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
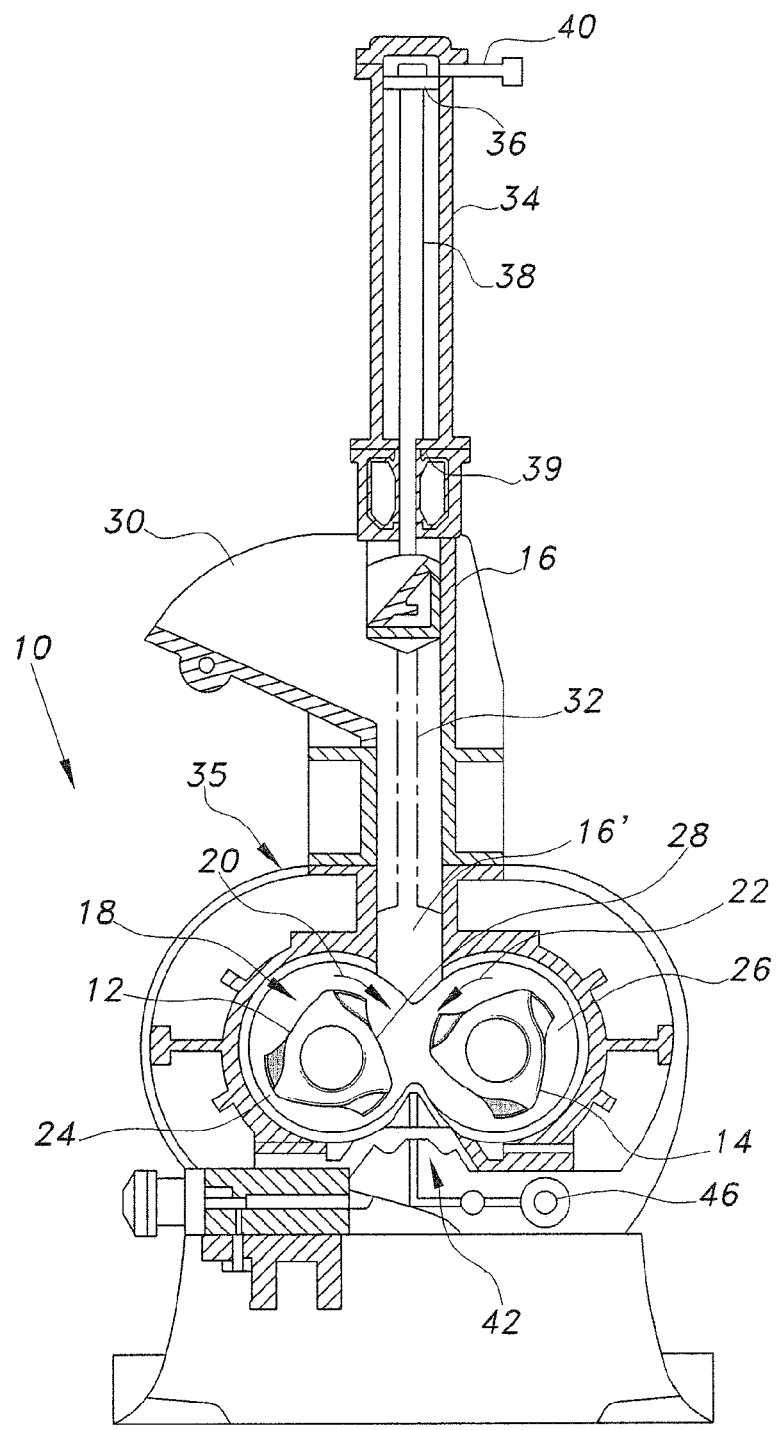
FIG. 1 is a side view in section of an internal batch mixer with three-wing non-intermeshing rotors according to the present invention.
Figure 2:
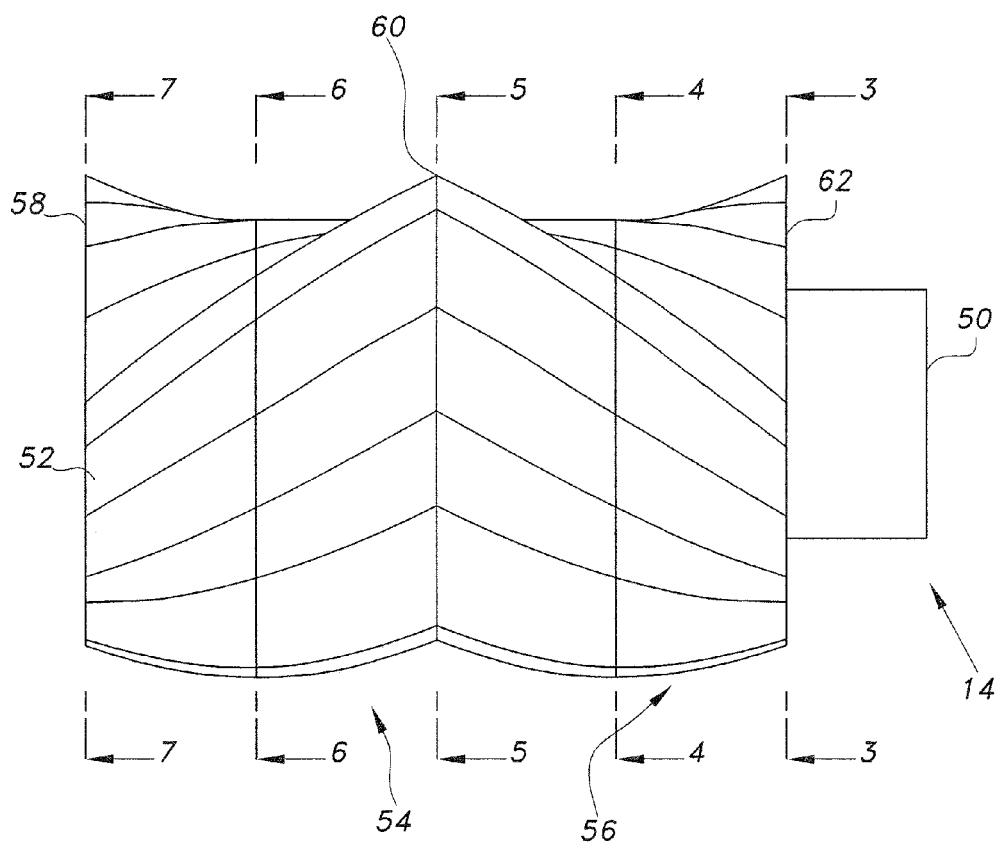
FIG. 2 is a side view of a rotor of the internal batch mixer with three-wing non-intermeshing rotors.

As shown in FIG. 1, the internal batch mixer with three-wing non-intermeshing rotors 10 is similar to a conventional internal batch mixer, but includes a pair of three-wing, non-intermeshing, counter-rotating tangential rotors 12, 14. As in a conventional internal batch mixer, a vertically adjustable ram 16 is movable between a raised position and a lowered operating position (indicated as 16' in dashed outline). This ram 16 is used to move materials to be mixed down into a mixing chamber 18. In its operating position 16', the vertically adjustable ram 16 opposes the forces exerted by materials in the mixing chamber 18 as they are being thoroughly and intensely mixed by the wings of the counter-rotating tangential rotors 12, 14 (as will be described in greater detail below). Within mixing chamber 18, the counter-rotating tangential rotors 12, 14 rotate about spaced parallel horizontal axes, as indicated by arrows 20 and 22, respectively, in FIG. 1. As shown, the left rotor 12 (in the configuration of FIG. 1) rotates in a clockwise direction about its axis, and the right rotor 14 rotates in a counter-clockwise direction.

Figure 8:
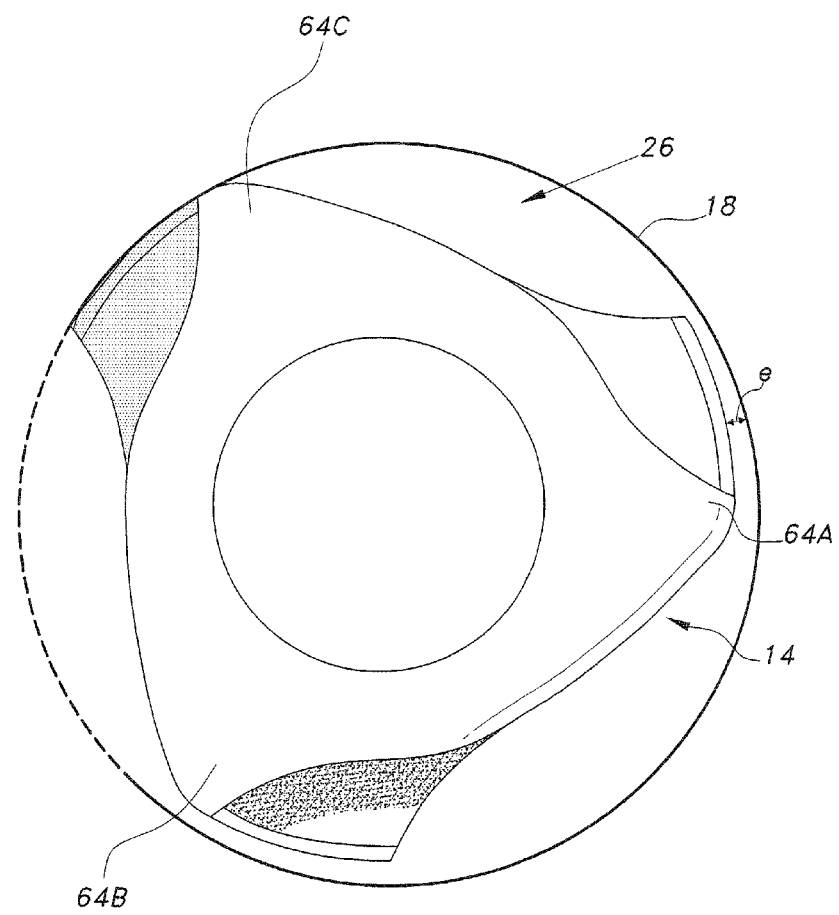
FIG. 8 diagrammatically illustrates a rotor of the internal batch mixer with three-wing non-intermeshing rotors within a mixing chamber thereof.

As shown more clearly in FIGS. 1 and 8, the mixing chamber 18 is shaped to accommodate these two rotors 12, 14 and includes first and second chamber cavities 24, 26, each having a generally circular cylindrical shape of radius $R_c$; i.e., each of the first and second chamber cavities 24, 26 has an identical curvature, each having the equal radius $R_c$. As shown, the first and second chamber cavities 24, 26 are positioned in a horizontally opposed relationship with respect to one another, and are also in open communication with one another. A central region 28 of the mixing chamber 18 is defined between the two rotors 12, 14.

The materials to be mixed are introduced into a hopper 30, while the ram 16 is raised, so that the materials can enter a chute 32 communicating with the hopper 30 and leading down into the central region 28 of the mixing chamber 18. The ram 16 is then lowered to push the materials down into the mixing chamber 18 and to retain them therein.

It should be understood that ram 16 may be driven by any suitable type of manual or automated drive system. In FIG. 1, the ram 16 is shown being operated by a fluid-actuated drive cylinder 34, as in a conventional internal batch mixer, although it should be understood that fluid-activated drive cylinder 34 is shown for exemplary purposes only. As in a conventional internal batch mixer, the fluid-activated drive cylinder is mounted at the top of the overall housing 35 of the internal batch mixer with three-wing non-intermeshing rotors 10. The fluid cylinder 34, which may be hydraulic or pneumatic, contains a double-acting piston 36 with a piston rod 38 connected to the ram 16 for lowering and raising ram 16. The ram 16 is secured to the lower end of the piston rod 38 below the bottom end 39 of the cylinder 34. Actuating fluid under the desired pressure is fed through a supply line 40 into the upper portion of the cylinder 34 for urging the piston 36 downwardly to the lowered operating position 16'. After the mixing operation has been completed, the ram 16 is retracted back up to its raised position by actuating fluid fed into the cylinder 34 below the piston 36 through a suitable supply line. The mixed and homogenized materials are discharged from the bottom of the mixing chamber 18 through a discharge opening normally closed by a door 42.

Figure 3:
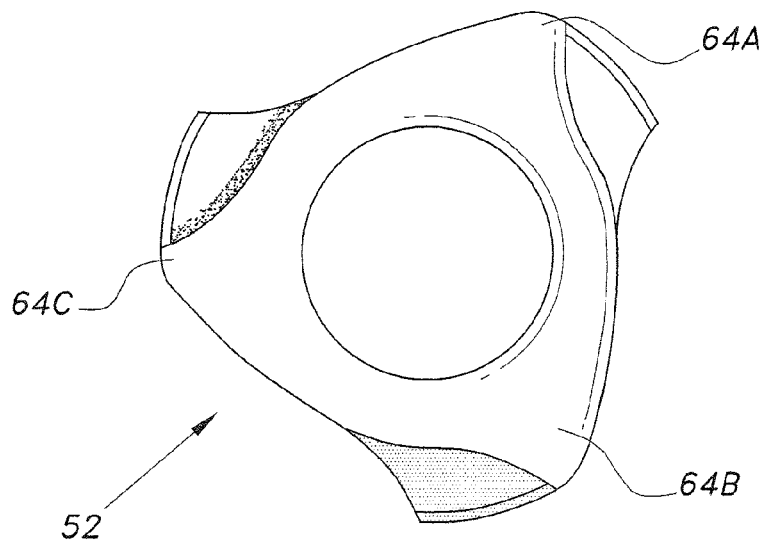
FIG. 3 is a sectional view, taken along sectional lines 3-3, of the rotor of FIG. 2.
Figure 4:
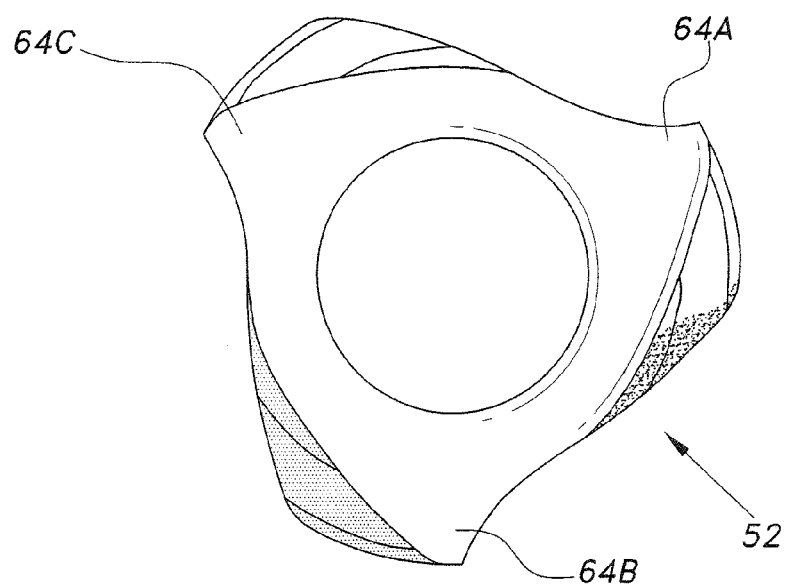
FIG. 4 is a sectional view, taken along sectional lines 4-4, of the rotor of FIG. 2.
Figure 5:
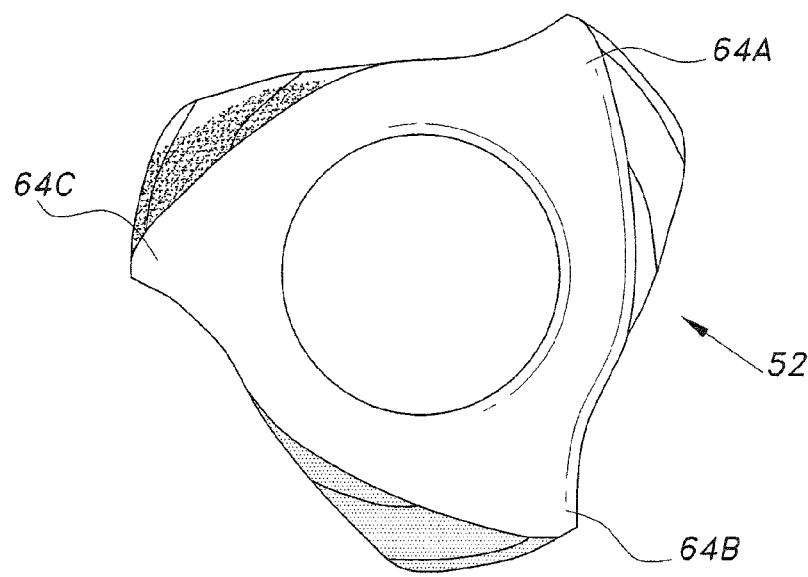
FIG. 5 is a sectional view, taken along sectional lines 5-5, of the rotor of FIG. 2.
Figure 6:
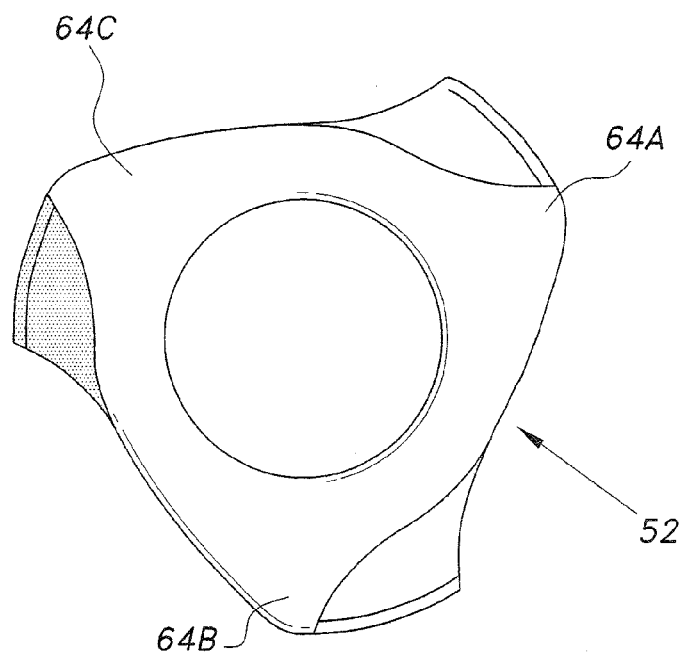
FIG. 6 is a sectional view, taken along sectional lines 6-6, of the rotor of FIG. 2.
Figure 7:
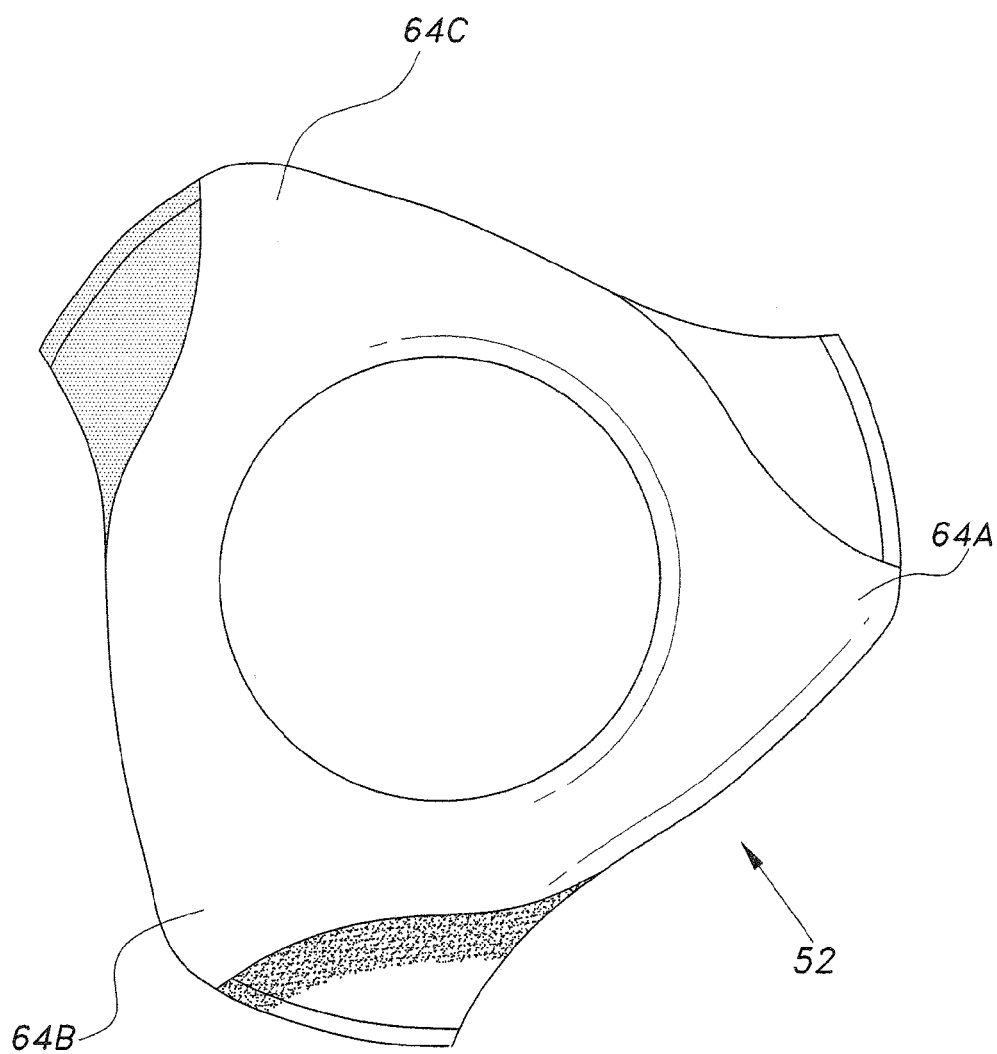
FIG. 7 is a sectional view, taken along sectional lines 7-7, of the rotor of FIG. 2.

As in a conventional internal batch mixer, the rotors 12, 14 are driven to rotate in opposite directions 20, 22 by a gear mechanism or the like which is driven by a drive motor. FIG. 3 illustrates rotor 14, although it should be understood that rotor 12 and rotor 14 are preferably identical. Rotor 14 includes a blade body 52 mounted about an axle 50. As shown, blade body 52 includes a first portion 54 and a second portion 56. Between a first end 58 of blade body 52 and an axial center 60 of blade body 52, first portion 54 is helically shaped with a twist of 60° in a first rotational direction (e.g., counterclockwise). Between a second end 62 of blade body 52 and the axial center 60 of blade body 52, second portion 56 is helically shaped with a twist of 60° in a second rotational direction (e.g., clockwise). In order to best show the overall shape of blade body 52, FIG. 3 shows blade body 52 taken along cross-sectional cut line 3-3. FIG. 4 shows blade body 52 taken along cross-sectional cut line 4-4. FIG. 5 shows blade body 52 taken along cross-sectional cut line 5-5. FIG. 6 shows blade body 52 taken along cross-sectional cut line 6-6. FIG. 7 shows blade body 52 taken along cross-sectional cut line 7-7.

As shown in FIGS. 3-8, the blade body 52 of each of rotors 12, 14 is formed from three wings 64A, 64B and 64C.

In FIG. 8, the radial clearance e is the radial distance between one of the wings and the wall of mixing chamber 18. Wings 64A and 64B preferably each have equal clearances (i.e., they each preferably have equal dimensions) of $$e = \frac{R_c}{40},$$

where $R_c$ is the radius of each of the first and second chamber cavities 24, 26. Wing 64C preferably has zero clearance (or very close to zero).

The clearance may also be defined by the difference between the radius of the rotor tip, $R_t$, and the chamber cavity radius, $R_c$. The condition $R_t \leq R_c$ is considered a critical value for the functioning of the internal batch mixer with three-wing non-intermeshing rotors 10, which generates secondary flow due to the rotor tip angle. The angle of tip is the critical parameter for the generation of secondary flow.

The clearance e plays a vital role in the generation of secondary flow, which, in turn, leads to the appearance of elongation flow in the flow domain. At $$e = \frac{R_c}{40},$$

wing 64A and wing 64B generate maximum elongation flow. When mixing polymeric fluids, the clearance gap acts as a split channel, which breaks the molten polymers into droplets. The angled wing design of blade body 52 facilities the converged flow at the clearance. The clearance at wings 64A and 64B increases the dispersive mixing, leading to a notable increase in the distributive mixing.

Due to the clearance at wings 64A and 64B, there is a large probability of stagnant flow at the mixing chamber wall. This is why the clearance at wing 64C is kept as small as possible. The small clearance also allows wing 64C to act as a sweeper to remove all of the materials from the chamber wall to the center 28 of mixing chamber 18.

Figure 9:
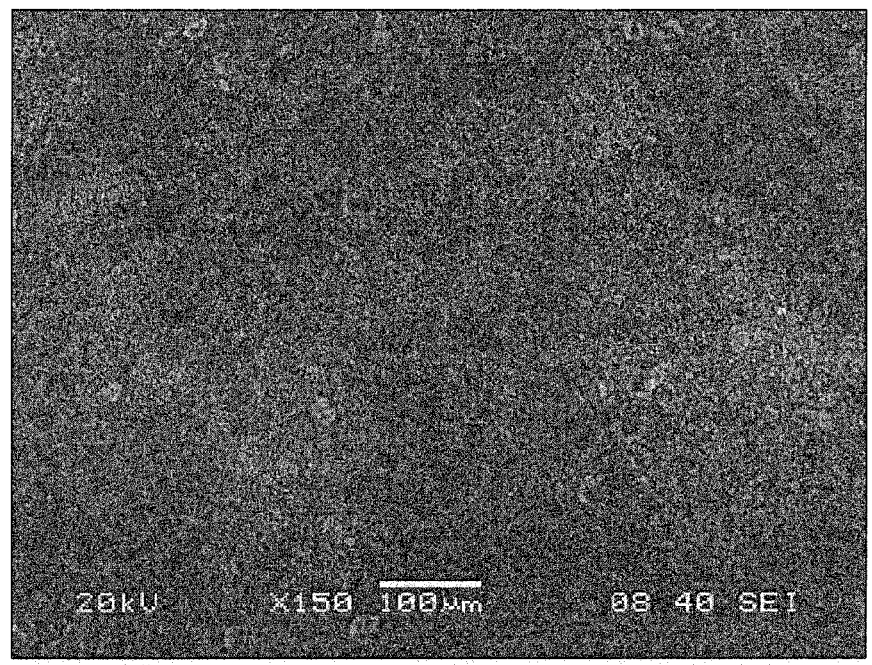
FIG. 9 is a scanning electron microscope (SEM) image of 2% nanoclay in a high density polyethylene (HDPE) polymer matrix, mixed by a conventional Banbury mixer at 30 rpm (shown at a 100 μm scale).
Figure 10:
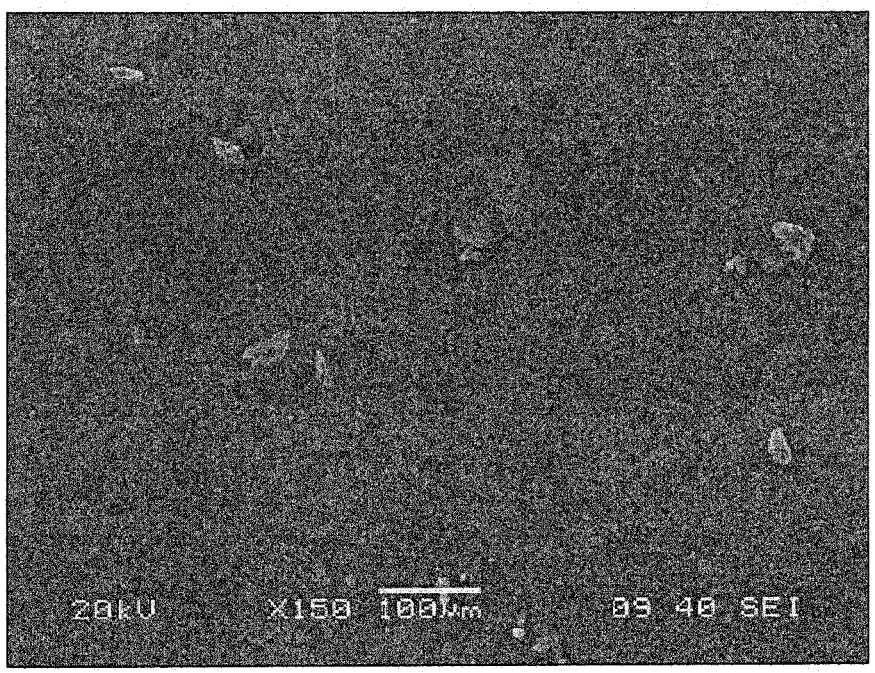
FIG. 10 is a scanning electron microscope (SEM) image of 2% nanoclay in a high density polyethylene (HDPE) polymer matrix, mixed by the internal batch mixer with three-wing non-intermeshing rotors according to the present invention (shown at a 100 μm scale).
Figure 11:
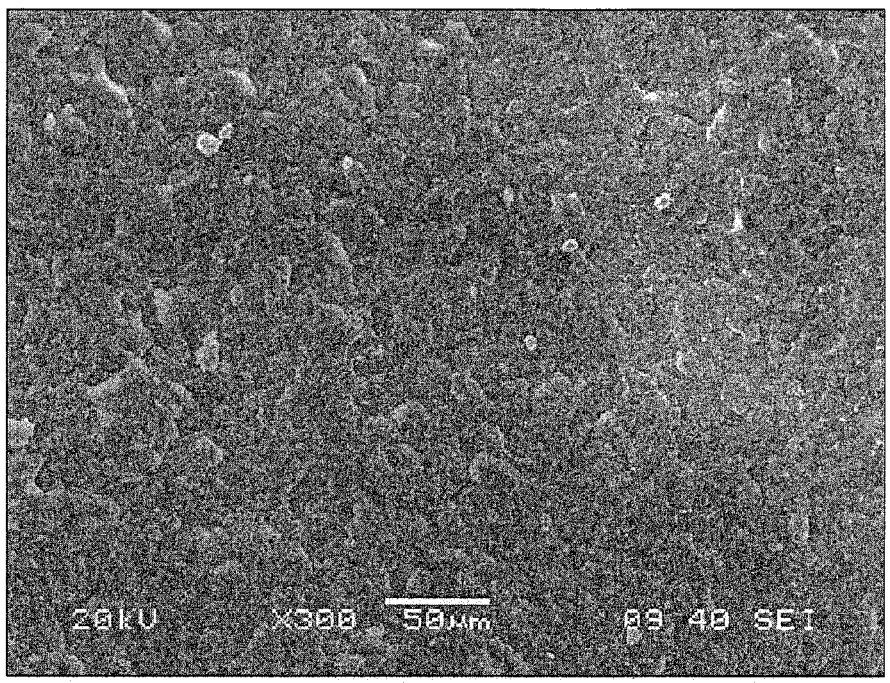
FIG. 11 is a scanning electron microscope (SEM) image of the 2% nanoclay in a high density polyethylene (HDPE) polymer matrix, mixed by the conventional Banbury mixer at 30 rpm of FIG. 9, shown at a 50 μm scale.
Figure 12:
FIG. 12 is a scanning electron microscope (SEM) image of the 2% nanoclay in a high density polyethylene (HDPE) polymer matrix, mixed by the internal batch mixer with three-wing non-intermeshing rotors according to the present invention at 30 rpm of FIG. 10, shown at a 50 μm scale.

In order to show the effectiveness of the present invention, FIGS. 9 and 11 show scanning electron microscope (SEM) images of 2% nanoclay in a high density polyethylene (HDPE) polymer matrix, mixed by a conventional Banbury mixer at 30 rpm (shown at 100 μm and 50 μm scales, respectively). For purposes of comparison, FIGS. 10 and 12 show scanning electron microscope (SEM) images of the same 2% nanoclay in a high density polyethylene (HDPE) polymer matrix, mixed by the internal batch mixer with three-wing non-intermeshing rotors 10 at 30 rpm (shown at 100 μm and 50 μm scales, respectively). One can clearly see that the internal batch mixer with three-wing non-intermeshing rotors 10 significantly improves distribution and dispersion of the nanoclay particles.

It is to be understood that the present invention is not limited to the embodiments described above, but encompasses any and all embodiments within the scope of the following claims.

We claim:

1. An internal batch mixer with three-wing non-intermeshing rotors, comprising:
    a housing defining a mixing chamber, the mixing chamber having first and second substantially circular chamber cavities in open communication with one another at a central region of the mixing chamber;

first and second non-intermeshing, counter-rotating winged rotors respectively rotationally mounted within the first and second substantially circular chamber cavities, wherein the central region of the mixing chamber defines an interacting mixing region between the first and second non-intermeshing, counter-rotating winged rotors; and means for driving counter-rotation of the first and second non-intermeshing, counter-rotating winged rotors with respect to one another, wherein each of the first and second non-intermeshing, counter-rotating winged rotors comprises a blade body and an axle, the blade body having first, second and third wings each having a substantially helical contour, a radial clearance between each of the first and second wings and an internal wall of the mixing chamber being defined by $$e = \frac{R_c}{40},$$

where e is the radial clearance and $R_c$ is a radius of each of the first and second substantially circular chamber cavities, said blade body having opposed first and second ends, such that a first portion of the blade body is defined between the first end thereof and an axial center thereof, and a second portion of the blade body is defined between the second end thereof and the axial center thereof, wherein the first portion is helically twisted by 60° in a first rotational direction and the second portion is helically twisted by 60° in a second rotational direction opposite the first rotational direction, a first twisted contour of the first portion being continuous with a second twisted contour of the second portion at the axial center.

2. The internal batch mixer with three-wing non-intermeshing rotors as recited in claim 1, wherein a radial clearance between the third wing and the internal wall of the mixing chamber is zero.

3. An internal batch mixer with three-wing non-intermeshing rotors, comprising:

a housing defining a mixing chamber, the mixing chamber having first and second substantially circular chamber cavities in open communication with one another at a central region of the mixing chamber;

first and second non-intermeshing, counter-rotating winged rotors respectively rotationally mounted within the first and second substantially circular chamber cavities, wherein the central region of the mixing chamber defines an interacting mixing region between the first and second non-intermeshing, counter-rotating winged rotors; and means for driving counter-rotation of the first and second non-intermeshing, counter-rotating winged rotors with respect to one another, wherein each of the first and second non-intermeshing, counter-rotating winged rotors comprises a blade body and an axle, the blade body having first, second and third wings each having a substantially helical contour, and having opposed first and second ends, such that a first portion of the blade body is defined between the first end thereof and an axial center thereof, and a second portion of the blade body is defined between the second end thereof and the axial center thereof, wherein the first portion is helically twisted by 60° in a first rotational direction and the second portion is helically twisted by 60° in a second rotational direction opposite the first rotational direction, a first twisted contour of the first portion being continuous with a second twisted contour of the second portion at the axial center.

4. The internal batch mixer with three-wing non-intermeshing rotors as recited in claim 3, wherein a radial clearance between each of the first and second wings and an internal wall of the mixing chamber is defined by $$e = \frac{R_c}{40},$$

where e is the radial clearance and $R_c$ is a radius of each of the first and second substantially circular chamber cavities.

5. The internal batch mixer with three-wing non-intermeshing rotors as recited in claim 3, wherein a radial clearance between the third wing and the internal wall of the mixing chamber is zero.

* * * * *